United States Patent
Liu et al.

(10) Patent No.: US 10,907,767 B2
(45) Date of Patent: Feb. 2, 2021

(54) GUIDE RAIL OILING TOOL

(71) Applicants: BOE TECHNOLOGY GROUP CO., LTD., Beijing (CN); Hefei BOE Optoelectronics Technology Co., Ltd., Anhui (CN)

(72) Inventors: Huan Liu, Beijing (CN); Xunze Zhang, Beijing (CN); Gan Song, Beijing (CN); Hao Zhu, Beijing (CN); Dong Ding, Beijing (CN); Xiaokun Wang, Beijing (CN); Qingliang Wen, Beijing (CN); Jian Wang, Beijing (CN); Wenjun Zhang, Beijing (CN); Zengzhi Xuan, Beijing (CN); Wei Dong, Beijing (CN); Jinwei Huang, Beijing (CN); Hu Wang, Beijing (CN); Hualu Wang, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 260 days.

(21) Appl. No.: 16/053,913

(22) Filed: Aug. 3, 2018

(65) Prior Publication Data

US 2019/0101242 A1    Apr. 4, 2019

(30) Foreign Application Priority Data

Sep. 30, 2017    (CN) .......................... 2017 1 0918952

(51) Int. Cl.
*F16N 21/02*    (2006.01)
*F16N 1/00*    (2006.01)
(Continued)

(52) U.S. Cl.
CPC ............... *F16N 21/02* (2013.01); *F16N 1/00* (2013.01); *F16N 7/14* (2013.01); *F16N 25/02* (2013.01)

(58) Field of Classification Search
CPC .................................. F16N 15/00; F16N 21/02
(Continued)

(56) References Cited

U.S. PATENT DOCUMENTS

| 296,440 | A | * | 4/1884 | Oliver | ...................... D06B 1/14 |
|---|---|---|---|---|---|
| | | | | | 118/234 |
| 1,007,422 | A | * | 10/1911 | Berger | .................. B66B 7/1269 |
| | | | | | 184/21 |

(Continued)

FOREIGN PATENT DOCUMENTS

| CN | 101804641 A | 8/2010 |
|---|---|---|
| CN | 102720763 A | 10/2012 |

(Continued)

OTHER PUBLICATIONS

First Office Action for Chinese Patent Application No. 201710918952.5 dated Oct. 8, 2018.

(Continued)

*Primary Examiner* — Michael R Mansen
*Assistant Examiner* — Mark K Buse
(74) *Attorney, Agent, or Firm* — Calfee, Halter & Griswold LLP

(57) ABSTRACT

A guide rail oiling tool includes: a sliding body, which is capped on a guide rail and slidable along the guide rail, and has an inner side surface facing a surface to be oiled of the guide rail, a shape of the inner side surface being matched with a shape of the surface to be oiled of the guide rail; an oil inlet disposed on the sliding body; and an oiling groove in communication with the oil inlet, disposed on the inner side surface of the sliding body and surrounding the surface (Continued)

to be oiled of the guide rail, so that the oiling groove applies oil to the surface to be oiled of the guide rail when the sliding body is sliding.

16 Claims, 2 Drawing Sheets

(51) Int. Cl.
*F16N 7/14* (2006.01)
*F16N 25/02* (2006.01)
(58) Field of Classification Search
USPC .......................................................... 184/15 R
See application file for complete search history.

(56) References Cited

U.S. PATENT DOCUMENTS

| | | | | |
|---|---|---|---|---|
| 1,049,170 | A * | 12/1912 | Thomas | B05C 3/12 118/405 |
| 2,847,880 | A * | 8/1958 | Neidig | B23Q 11/10 408/59 |
| 2,995,212 | A * | 8/1961 | Dinkelkamp | F16N 13/08 184/28 |
| 3,565,213 | A * | 2/1971 | Heller | H02G 1/08 184/15.2 |
| 4,169,427 | A * | 10/1979 | Crump | B08B 1/008 118/307 |
| 4,296,837 | A * | 10/1981 | Charlton | H02G 1/08 184/15.1 |
| 4,498,558 | A * | 2/1985 | Bendahan | D07B 7/12 15/220.4 |
| 4,862,996 | A * | 9/1989 | Chisholm | F16N 7/00 184/15.1 |
| 4,891,037 | A * | 1/1990 | Maples | B62J 31/00 184/15.1 |
| 5,022,493 | A * | 6/1991 | Buckelew | A47L 25/00 15/210.1 |
| 5,213,180 | A * | 5/1993 | Masonek | B62J 31/00 184/15.1 |
| 5,360,084 | A * | 11/1994 | Graf | A46B 11/063 15/256.5 |
| 5,386,882 | A * | 2/1995 | Friend | A46B 15/00 15/256.6 |
| 5,492,413 | A * | 2/1996 | Tsukada | F16C 29/0647 384/15 |
| 5,678,927 | A * | 10/1997 | Yabe | F16C 29/0635 384/13 |
| 6,098,755 | A * | 8/2000 | Wyssmann | B08B 1/02 184/15.1 |
| 6,098,756 | A * | 8/2000 | Shigetomi | B66B 7/1269 184/21 |
| 6,123,457 | A * | 9/2000 | Suzuki | F16C 29/0609 184/5 |
| 6,250,804 | B1 * | 6/2001 | Hsu | F16C 33/6651 384/13 |
| 6,290,394 | B1 * | 9/2001 | Obara | B23Q 11/124 384/13 |
| 6,435,718 | B1 * | 8/2002 | Weiss | F16C 33/6611 384/13 |
| 6,655,426 | B2 * | 12/2003 | Shevela | F16N 3/08 141/382 |
| 6,725,973 | B2 * | 4/2004 | Coder | H02G 1/08 184/15.1 |
| 7,380,988 | B1 * | 6/2008 | Chen | F16C 29/065 384/15 |
| 7,469,803 | B2 * | 12/2008 | Weems | F16N 3/12 184/105.2 |
| 7,513,336 | B2 * | 4/2009 | Hsu | F16C 29/0609 184/2 |
| 7,527,176 | B2 * | 5/2009 | Weems | F16N 3/12 184/105.2 |
| 7,909,512 | B2 * | 3/2011 | Kuwabara | F16C 33/6648 184/5 |
| 9,079,720 | B1 * | 7/2015 | Schmidt | F16H 57/05 |
| 9,939,013 | B2 * | 4/2018 | Matsumoto | F16C 29/0609 |
| 2001/0027900 | A1 * | 10/2001 | Wilcox | F16C 33/6625 184/105.3 |
| 2007/0012516 | A1 * | 1/2007 | Hsu | F16C 29/0609 184/5 |
| 2007/0172158 | A1 * | 7/2007 | Chen | F16C 29/02 384/13 |
| 2008/0232724 | A1 * | 9/2008 | Kuwabara | F16C 29/065 384/13 |
| 2010/0155180 | A1 * | 6/2010 | Chou | F16C 29/00 184/105.3 |
| 2011/0170809 | A1 * | 7/2011 | Chen | F16C 29/0633 384/13 |
| 2013/0121625 | A1 * | 5/2013 | Furusawa | F16C 29/0647 384/15 |
| 2013/0195386 | A1 * | 8/2013 | Matsumoto | F16C 29/086 384/13 |
| 2015/0368069 | A1 * | 12/2015 | Lehikoinen | B66B 7/1269 184/106 |
| 2016/0061261 | A1 * | 3/2016 | Yamagishi | F16C 33/6659 184/14 |
| 2016/0281789 | A1 * | 9/2016 | Kleinikkink | H02K 7/08 |

FOREIGN PATENT DOCUMENTS

| | | |
|---|---|---|
| CN | 202884437 U | 4/2013 |
| CN | 103084848 A | 5/2013 |
| CN | 205244135 U | 5/2016 |
| CN | 105710698 A | 6/2016 |

OTHER PUBLICATIONS

Third Office Action for Chinese Patent Application No. 201710918952.5 dated Sep. 25, 2019.

* cited by examiner

GUIDE RAIL OILING TOOL

CROSS REFERENCE TO RELATED APPLICATIONS

This application claims the benefit of China Patent Application No. 201710918952.5 filed with the China Patent Office on Sep. 30, 2017, the entire content of which is hereby incorporated by reference.

TECHNICAL FIELD

The present disclosure relates to the field of guide rail lubrication technology, and more particularly, to a guide rail oiling tool.

BACKGROUND

At present, a linear motion guide (LM Guide for short) is required by many devices in an Array factory in Thin Film Transistor (TFT)-LCD industry, Sputter Anneal is taken as an example: an anneal device is used to reduce film stress and improve stability of a TFT. The picking and placing of Glass by the Anneal device are implemented through a switch-on and off of a Shutter door and Robot, the switch-on and off of the Shutter door is realized by the linear motion guide, so uniformity of applying of a lubricating oil on a surface of the linear motion guide is very crucial.

There are two types of applying a lubricating oil on a surface of the linear motion guide. One of the operation modes is to apply the lubricating oil to the guide rail by injecting oil into an oil nozzle through an oil gun The oil nozzle is provided on the guide rail, and after the lubricated oil is applied to the guide rail by injecting oil to the oil nozzle through the oil gun, the switch-on and off of the Shutter door is controlled to uniformly apply the lubricating oil as much as possible. However, through long-term practice, it is found that such an oiling manner cannot uniformly apply the lubricating oil to the surface of the guide on rail, there will be more lubricating oil near the position of the oil nozzle, and less or none lubricating oil on the guide rail away from the position of the oil nozzle, which increases friction of the surface of the guide rail having no lubricating oil, thereby reducing the service life of the guide rail. The other of the operation modes is to evenly apply the lubricating oil to the surface of the guide rail by human with their fingers or a brush. This operation manner can effectively improve the uniformity of oiling; however, there are mainly the following problems: first, the manual application of the lubricating oil will cause oil to be applied to equipment at the peripheral of the guide rail, thereby causing waste and pollution; second, the low efficiency of the manual application of the lubricating oil affects time in which the guide rail provides service again; third, labor cost will be increased; fourth, the uniformity and efficiency of the manual application of the lubricating oil are determined by the proficiency of the workers, the uniformity of the manual application of the lubricating oil by a new unexperienced worker is still not ideal, and the thickness of the applied lubricating oil by human varies from person to person with a big difference.

The above-described information disclosed in the Background is only used to enhance the understanding of the background of the present disclosure, and thus it may include information that does not constitute prior art technology known by those skilled in the art.

SUMMARY

According to an aspect of the present disclosure, a guide rail oiling tool is provided, including:

a sliding body, which is capped on a guide rail and slidable along the guide rail, and has an inner side surface facing a surface to be oiled of the guide rail, a shape of the inner side surface being matched with a shape of the surface to be oiled of the guide rail;

an oil inlet disposed on the sliding body; and an oiling groove in communication with the oil inlet, disposed on the inner side surface of the sliding body and surrounding the surface to be oiled of the guide rail, so that the oiling groove applies oil to the surface to be oiled of the guide rail when the sliding body is sliding.

In an exemplary embodiment of the present disclosure, the guide rail oiling tool further includes:

a cleaning layer disposed on the sliding body and attached to the surface to be oiled of the guide rail, and surrounding the surface to be oiled of the guide rail so as to clean contaminants on the surface to be oiled of the guide rail when the sliding body is sliding.

In an exemplary embodiment of the present disclosure, the cleaning layer is disposed on the inner side surface of the sliding body and protrudes from the inner side surface of the sliding body.

In an exemplary embodiment of the present disclosure, the cleaning layer is disposed on a front side of the oiling groove during working.

In an exemplary embodiment of the present disclosure, the sliding body comprises a first sub-sliding body and a second sub-sliding body that are relatively movable; wherein the first sub-sliding body is located on one side of the guide rail; and the second sub-sliding body is located on the other side of the guide rail.

In an exemplary embodiment of the present disclosure, the sliding body further includes:

a connector disposed on a side of the sliding body away from the inner side surface and configured to connect the first sub-sliding body and the second sub-sliding body.

In an exemplary embodiment of the present disclosure, the connector is one or more of a buckle and a hinge.

In an exemplary embodiment of the present disclosure, the first sub-sliding body is provided thereon with a through hole, and the second sub-sliding body is provided thereon with a threaded hole; the sliding body further includes:

an adjusting bolt, which is fitted to the threaded hole in a screw-thread manner by passing through the through-hole so that the first sub-sliding body and the second sub-sliding body are integrally fixed, and a gap between the sliding body and the guide rail being adjusted based on a depth of the threaded hole to which the adjusting bolt is screwed.

In an exemplary embodiment of the present disclosure, the oil inlet extends from a side of the sliding body away from the inner side surface to the oiling groove.

In an exemplary embodiment of the present disclosure, the guide rail oiling tool further includes:

an oil gun connected to the oil inlet and supplying a lubricating oil to the oiling groove through the oil inlet; and an oil injecting pipe connected between the oil inlet and the oil gun.

BRIEF DESCRIPTION OF THE DRAWINGS

The above-described and other features and advantages of the present disclosure will become more apparent from the detailed descriptions of exemplary embodiments with reference with the accompanying drawings.

Figure 1:
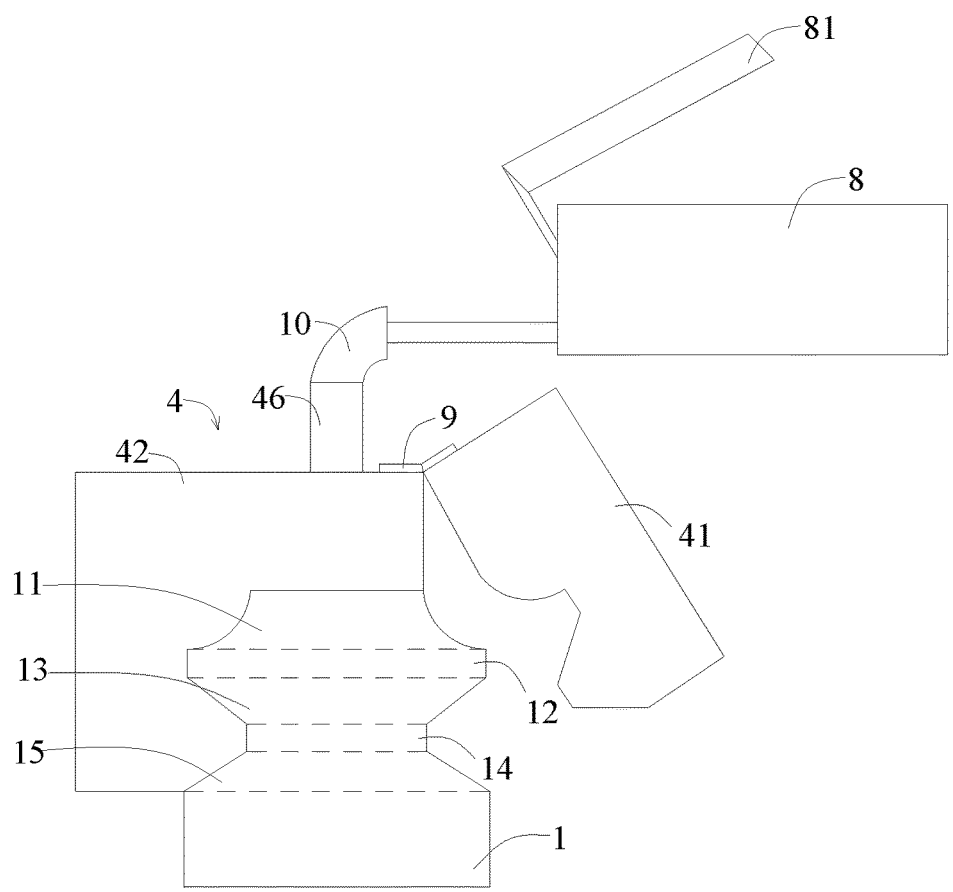
FIG. 1 is a structural schematic diagram of an implementation manner of a guide rail oiling tool according to the present disclosure.

Reference signs of main components in the drawings will be described as follows:

1 guide rail; 11 first trapezoidal sub-guide rail; 12 first rectangular sub-guide rail; 13 second trapezoidal sub-guide rail; 14 second rectangular sub-guide rail; 15 third trapezoidal sub-guide rail;

4 sliding body; 41 first sub-sliding body; 42 second sub-sliding body; 43 through hole; 44 threaded hole; 45 adjusting bolt; 46 oil inlet;

5 inner side surface; 51 top side surface; 52 curved side surface; 53 first straight side surface; 54 first oblique side surface; 55 second straight side surface; 56 second oblique side surface;

6 oiling groove;

7 cleaning layer;

8 oil gun; 81 rocking handle;

9 connector;

10 oil filling pipe.

DETAILED DESCRIPTION

Exemplary embodiments will now be described more fully with reference to the accompanying drawings. However, the exemplary embodiments may be embodied in a variety of forms and should not be construed as being limited to the embodiments set forth herein. On the contrary, the embodiments are provided to make the present disclosure comprehensive and through and to fully convey the concept of the exemplary embodiments to those skilled in the art. The same reference signs in the drawings denote the same or similar structures, and detailed descriptions thereof will be omitted.

FIG. 1 is a structural schematic diagram illustrating an implementation manner of a guide rail oiling tool according to the present disclosure. Referring to FIG. 1, the guide rail oiling tool can include a sliding body 4, an inner side surface 5, an oiling groove 6, an oil gun 8, a cleaning layer 7, and the like. The guide rail oiling tool can evenly apply a lubricating oil to a guide rail with a high efficiency. According to an embodiment of the guide rail oiling tool of the present disclosure, the shape of the inner side surface of the sliding body is matched with the shape of the surface to be oiled of the guide rail, and the inner side surface is provided with the oiling groove, which surrounds the surface to be oiled of the guide rail, the sliding body is provided thereon with the oil inlet in communication with the oil gun, the sliding body is slidable on the guide rail, and the lubricating oil in the oil gun is evenly coated on the surface to be oiled of the guide rail through the oiling groove when the sliding body is sliding on the guide rail. In an aspect, the oiling groove surrounds the surface to be oiled of the guide rail so that the lubricating oil is evenly applied without variability. In another aspect, by sliding of the sliding body on the guide rail, the oiling of the guide rail is highly efficient and will not affect the time in which the guide rail provides service again. In still another aspect, grease will not be applied to equipment at the periphery of the guide rail, thus no waste and pollution will be caused. In yet still another aspect, costs are lower than manual operation.

Figure 2:
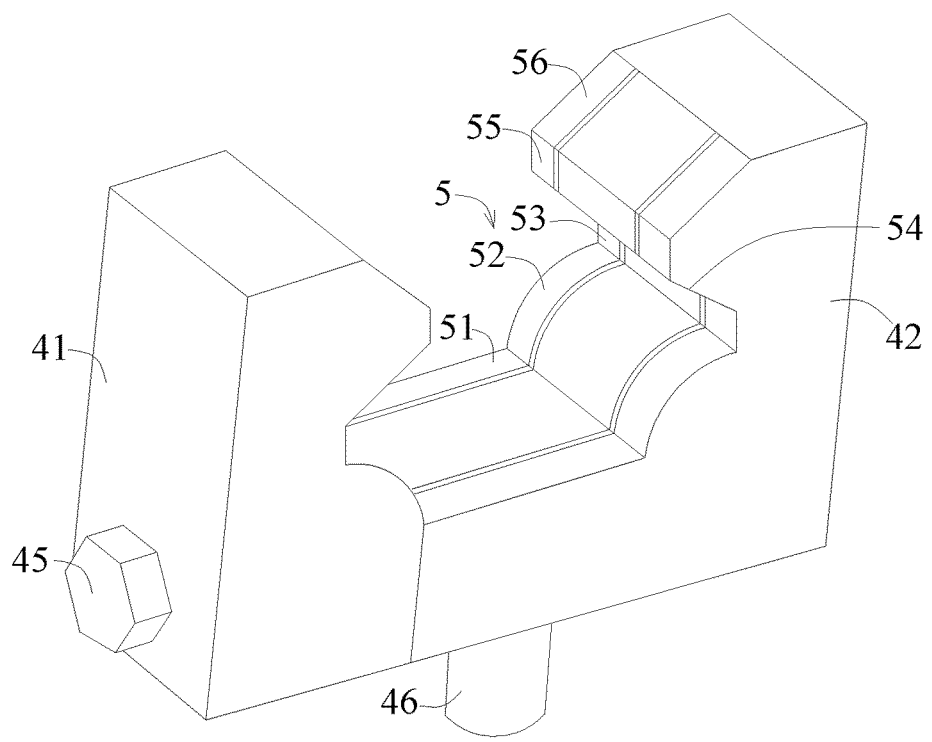
FIG. 2 is a structural schematic diagram of a sliding body in a closed state in FIG. 1.

In the present exemplary embodiment, a guide rail 1 can include a first trapezoidal sub-guide rail 11, a first rectangular sub-guide rail 12, a second trapezoidal sub-guide rail 13, a second rectangular sub-guide rail 14, a third trapezoidal sub-guide rail 15, and the like sequentially connected from top to bottom. In FIG. 2, for convenience of distinction, the guide rail is divided into several parts as described above based on broken lines. The first trapezoidal sub-guide rail 11 and the second trapezoidal sub-guide rail 13 are disposed on both sides of the first rectangular sub-guide rail 12 in a basic symmetrical manner, and the second trapezoidal sub-guide rail 13 and the third trapezoidal sub-guide rail 15 are basically symmetrically disposed on both sides of the second rectangular sub-guide rail 14. Two oblique side surfaces of the first trapezoidal sub-guide 11 can be disposed in an inwardly concave arc shape.

The sliding body 4 is slidable on the guide rail 1 and is provided thereon with an oil inlet 46. In the present exemplary embodiment, the sliding body 4 can include a first sub-sliding body 41, a second sub-sliding body 42, and the like, wherein the first sub-sliding body 41 is capped on one side of the guide rail, and the second sub-sliding body 42 is capped on the other side of the guide rail 1. The sliding body 4 may be provided to have two side edges and a top edge, wherein the second sub-sliding body 42 may include one of the side edges and the top edge, the first sub-sliding body 41 may include the other of the side edges, and a connecting surface between the first sub-sliding body 41 and the second sub-sliding body 42 may be disposed on an upper side of the sliding body 4. The second sub-sliding body 42 is fitted to one side surface and a top surface of the guide rail 1, and the first sub-sliding body 41 is fitted to the other side surface of the guide rail 1. Because the guide rail 1 has protrusions and recesses, the sliding body 4 is provided in a split type so that the sliding body 4 can be conveniently mounted to the guide rail 1. It will be understood by those skilled in the art that the structure of the guide rail 1 and the structure of the sliding body 4 are not limited to the foregoing descriptions, for example, the guide rail 1 may be a trapezoidal guide rail, a dovetail guide rail, a triangular guide rail, a cylindrical linear optical axis guide rail, and the like. The connecting surface between the first sub-sliding body 41 and the second sub-sliding body 42 may also be disposed on a side of the sliding body 4. The sliding body 4 can be disposed integrally or disposed in a split type, for example, when the sliding body 4 is fitted to the trapezoidal guide rail or the triangular guide rail, it can be provided in an integrated form.

The sliding body 4 may further include a connector 9 which can connect the first sub-sliding body 41 and the second sub-sliding body 42. In the present exemplary embodiment, the connector 9 may be one or more of a buckle and a hinge. The connector 9 may be disposed on an outer side of the sliding body 4 to avoid friction of the connector 9 on the surfaces that the guide rail 1 and the sliding body 4 contact each other.

The first sub-sliding body 41 may be provided thereon with a through hole 43, and the second sub-sliding body 42 may be provided thereon with a threaded hole 44. The sliding body 4 may further include an adjusting bolt 45 which is fitted to the threaded hole 44 in a screw-thread manner by passing through the through hole 43 so as to integrally fix the first sub-sliding body 41 and the second sub-sliding body 42. In the present exemplary embodiment, the through hole 43, which is perpendicular to surfaces that the first sub-sliding body 41 and the second sub-sliding body 42 fits, may be provided on the first sub-sliding body 41, and the threaded hole 44, which is perpendicular to the surfaces that the first sub-sliding body 41 and the second sub-sliding body 42 fits, may be provided on the second sub-sliding body 42. The adjusting bolt 45 is fitted to the threaded hole 44 by passing through the through hole 43 such that the first sub-sliding body 41 and the second sub-sliding body 42 can be integrally fixed. A gap between the sliding body 4 and the guide rail 1 can also be adjusted by the adjusting bolt 45. In addition, in other exemplary embodiments of the present disclosure, the first sub-sliding body 41 and the second sub-sliding body 42 may also be connected and adjusted by bundling with a ribbon.

The oil inlet 46 extends from a side of the sliding body away from the inner side surface to the oiling groove. In the present exemplary embodiment, the oil inlet 46 extends from the upper side of the sliding body away from the inner side surface to the oiling groove. Specifically, the oil inlet 46 extends from the top edge of the sliding body 4 to the oiling groove, and the oil inlet 46 is vertically disposed. The oil inlet 46 is disposed at the top of the sliding body 4. During a working process, after injected through the oil gun 8, the lubricating oil automatically flows downward into the oiling groove 6 under gravity to facilitate performing of an oiling process.

Figure 3:
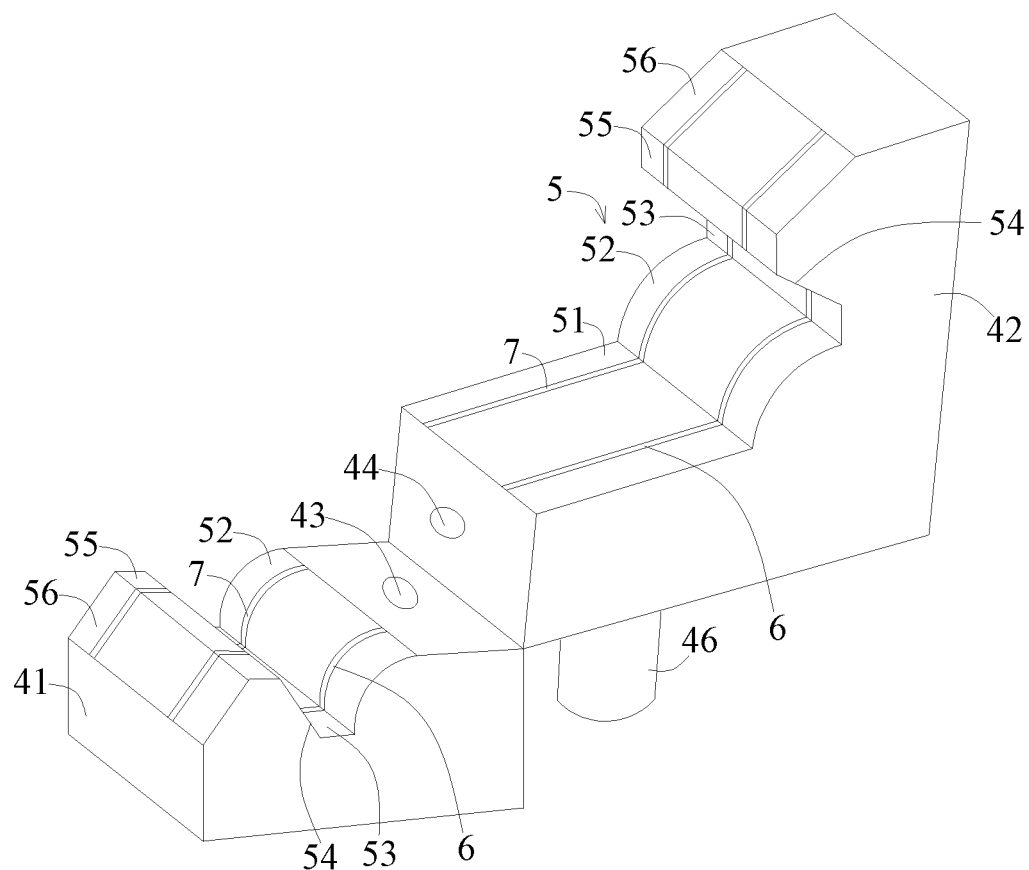
FIG. 3 is a structural schematic diagram of the sliding body of FIG. 2 after being opened.

FIGS. 2 and 3 are structural schematic diagrams illustrating the sliding body. Referring to FIGS. 2 and 3, the sliding body 4 is provided thereon with the inner side surface 5, a shape of the inner side surface 5 is matched with a shape of a surface to be oiled of the guide rail 1. In the present exemplary embodiment, the inner side surface 5 may include a top side surface 51 and two symmetrical curved side surfaces 52 that are matched with the first trapezoidal sub-guide rail 11 of the guide rail 1, two symmetrical first straight side surfaces 53 that are matched with the first rectangular sub-guide rail 12, two symmetrical first oblique side surfaces 54 that are matched with the second trapezoidal sub-guide rail 13, two symmetrical second straight side surfaces 55 that are matched with the second rectangular sub-guide rail 14, two symmetrical second oblique side surfaces 56 that are matched with the third trapezoidal sub-guide rail 15, and the like. The shape of the inner side surface 5 needs to be matched with the shape of the guide rail 1. It will be understood by those skilled in the art that based on the shape of the guide rail 1, the shape of the cross-section of the inner side surface 5 perpendicular to the guide rail can be set as a triangular shape, a trapezoidal shape, etc., which will not be elaborated herein.

Figure 4:
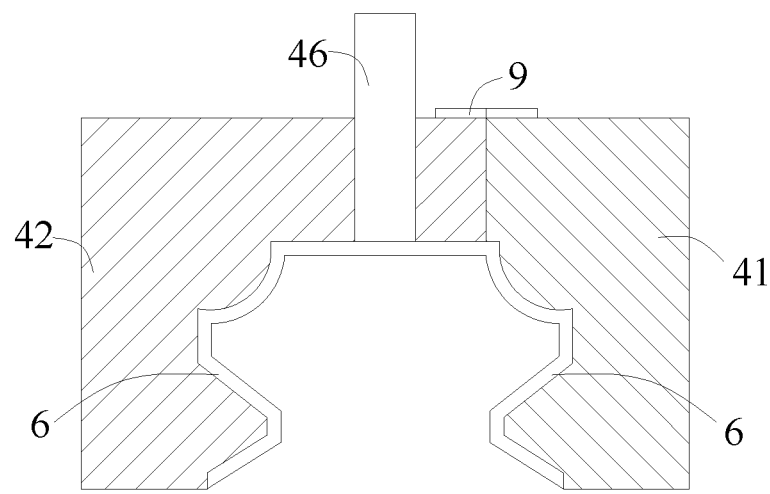
FIG. 4 is a cross-sectional view of the sliding body of FIG. 2 cut along an oiling groove.

FIG. 4 is a cross-sectional view showing the sliding body cut along the oiling groove. The oiling groove 6 is disposed on the inner side surface 5, and the oiling groove 6 is in communication with the oil inlet 46. The oiling groove 6 surrounds the surface to be oiled of the guide rail 1 so that the oiling groove 6 applies oil to the surface to be oiled of the guide rail 1 when the sliding body 4 is sliding. In the present exemplary embodiment, the oiling groove 6 is disposed along a plurality of side surfaces the inner side surface 5, and the oiling groove 6 is extending conforming to a shape of a cross section of the inner side surface 5. The oiling groove 6 surrounds the surface to be oiled of the guide rail 1. During the sliding of the sliding body 4, the lubricating oil flows out via the oiling groove 6, since each surface to be oiled of the guide rail 1 is provided with the oiling groove 6, the surfaces to be oiled of the guide rail 1 can be uniformly applied with the lubricating oil. Of course, the oiling groove 6 may not be disposed along a plurality of side surfaces of the inner side surface 5, that is, the oiling groove 6 may be disposed along a side surface.

Referring to FIG. 1, the oil gun 8 is coupled to the oil inlet 46 and supplies the lubricating oil to the oil inlet 46 and the oiling groove 6. In the present exemplary embodiment, the guide rail oiling tool further includes an oil injecting pipe 10, which is connected between the oil inlet 46 and the oil gun 8. The connection between the oil inlet 46 and the oil gun 8 by the oil injecting pipe 10 can realize rotational transformations of the oil gun 8 at various angles so as to be suitable for a variety of operating environments, especially, for an oiling operation in a narrow space.

Further, the guide rail oiling tool further includes the cleaning layer 7, which is disposed on the sliding body 4 and is attached to the surface to be oiled of the guide rail 1, and which surrounds the surface to be oiled of the guide rail 1 such that contaminants on the surface to be oiled of the guide rail 1 are cleaned by the cleaning layer 7 when the sliding body 4 is sliding. In the present exemplary embodiment, the cleaning layer 7 is disposed along a plurality of side surfaces of the inner side surface 5, and the cleaning layer 7 is extending conforming to a shape of a cross section of the inner side surface 5, and the cleaning layer 7 surrounds the surface to be oiled of the guide rail 1. During the sliding of the sliding body 4, the cleaning layer 7 can clean the surface to be oiled of the guide rail 1. The cleaning layer 7 is disposed in parallel with the oiling groove 6, and the cleaning layer 7 is disposed on a front side of the oiling groove 6 during working. The front side herein is a side that first contacts the surface to be oiled of the guide rail 1. In this way, the guide rail 1 is first cleaned and then oiled to prevent the contaminants on the guide rail 1 from polluting the newly applied lubricating oil. The cleaning layer 7 is disposed on the inner side surface 5 of the sliding body 4 and protrudes from the inner side surface 5 of the sliding body 4. According to an example, a mounting groove parallel to the oiling groove 6 is provided on the inner side surface 5 of the sliding body 4, and the cleaning layer 7 is engaged or adhered to the mounting groove. The cleaning layer 7 may be made from a rubber plate, or a brush or the like. The cleaning layer 7 may also be directly bonded to the inner side surface 5 of the sliding body 4. Certainly, the cleaning layer 7 may also be disposed on a front side surface of the sliding body 4. The front side surface herein is a side surface that first makes contact with the surface to be oiled of the guide rail 1, and the cleaning layer 7 may be fixed to the front side surface of the sliding body 4 by screws, bonding or the like.

The use process of a tool for oiling the guide rail 1 of the present disclosure will be described as follows:

When the oiling operation is performed, first, a buckle is unlocked, so that the sliding body 4 is substantially in an L shape, as shown in FIG. 3. The sliding body 4 is placed on a surface of the guide rail 1 at an angle of 90°, and the buckle is locked so that the sliding body 4 is substantially in a concave shape, as shown in FIGS. 2 and 4. Then confirm that the sliding body 4 and the guide rail 1 are perfectly fitted. The adjusting bolt 45 is then adjusted so that the sliding body 4 can be freely sliding on the guide rail 1. A rocking handle 81 of the oil gun 8 is pressed and then the sliding body 4 and the oil gun 8 are slowly moved. At this time, the cleaning layer 7 on the sliding body 4 first cleans the guide rail 1, and then the lubricating oil reaches the oiling groove 6 via the oil inlet 46 and flows out of the oiling groove 6 to complete grease coating on the surface of the guide rail 1. The rocking handle 81 of the oil gun 8 is continuously pressed and the sliding body 4 and the oil gun 8 are slowly moved until the surface to be oiled of the guide rail 1 is completely coated with the lubricating oil. After the oiling operation is finished, the buckle is unlocked, and the sliding body 4 is taken out, and dirty oil on the cleaning layer 7 is cleaned with a dust-free cloth.

With the guide rail oiling tool of the present disclosure, the shape of the cross-section of the inner side surface 5 of the sliding body 4 is matched with the shape of the cross-section of the surface to be oiled of the guide rail 1, and the inner side surface 5 is provided with the oiling groove 6, which surrounds the surface to be oiled of the guide rail 1, the sliding body 4 is provided thereon with the oil inlet 46 in communication with the oil gun 8, the sliding body 4 is slidable on the guide rail 1, and the lubricating oil in the oil gun 8 is evenly coated on the surface to be oiled of the guide rail 1 through the oiling groove 6 when the sliding body 4 is sliding on the guide rail 1. In an aspect, the oiling groove 6 surrounds the surface to be oiled of the guide rail 1 so that the lubricating oil is evenly applied without variability. In another aspect, by sliding of the sliding body 4 on the guide rail 1, the oiling of the guide rail 1 is highly efficient and will not affect the time in which the guide rail provides service again. In still another aspect, grease will not be applied to equipment at the periphery of the guide rail 1, thus no waste and pollution will be caused. In yet still another aspect, costs are lower than manual operation.

The features, structures, or characteristics described above may be combined in any suitable manner in one or more embodiments, and the features discussed in the various embodiments are interchangeable, if possible. In the above-mentioned descriptions, numerous specific details have been set forth to provide adequate understanding of the embodiments of the present disclosure. However, those skilled in the art will appreciate that the technical solutions of the present disclosure may be practiced without one or more of the specific details, or other methods, components, materials, and the like may be employed. In other instances, well-known structures, materials or operations will not be shown or described in detail to avoid obscuring the aspects of the present disclosure.

Although relative terms such as "upper" and "lower" are used in the specification of the present disclosure to describe the relationships of one component relative to another component, these terms are used in this specification to be illustrative of the present disclosure, for example, the direction of the example described the accompanying drawings. It will be understood that if the device is upside down, an "upper" component described above will become a "lower" component. Other relative terms such as "top", "bottom", "front" and "rear" have similar meanings. When a structure is "on" another structure, it is possible that the structure is integrally formed on the another structure, or that the structure is "directly" disposed on the another structure, or the structure is "indirectly" disposed on the another structure through other structure.

In the present specification, terms "a", "an", "the" and "said" are used to denote the presence of one or more elements/constituent parts/etc.; terms "comprising", "including" and "having" represent open-ended meanings and may refer to that, in addition to the listed elements/components, there may be additional elements/components; terms "first", "second" and "third" are only used as a token, rather than a limit on the number of objects.

It should be understood that the present disclosure is not limited to the detailed structure and arrangement manner of the components mentioned in the present disclosure. The present disclosure may include other embodiments and may be implementable and carried out in various manners. The foregoing variations and modifications fall into the scope of the present disclosure. It is to be understood that the present disclosure disclosed and claimed herein extends to all alternative combinations of two or more individual features that are mentioned in or apparent from the text and/or drawings. All of these different combinations constitute a number of alternative aspects of the present disclosure. The embodiments described in the specification are illustrative of the best mode for carrying out the present disclosure and will enable those skilled in the art to utilize the present disclosure.

What is claimed is:

1. A guide rail oiling tool, comprising:
 a sliding body, for capping on a guide rail and being slidable along the guide rail, the sliding body having an inner side surface for facing a surface to be oiled of the guide rail, and a shape of the inner side surface being matched with a shape of the surface to be oiled of the guide rail;
 an oil inlet disposed on the sliding body; and
 an oiling groove in communication with the oil inlet, disposed on the inner side surface of the sliding body for surrounding the surface to be oiled of the guide rail, so that the oiling groove applies oil to the surface to be oiled of the guide rail when the sliding body is sliding,
 wherein the guide rail oiling tool further comprises:
 a cleaning layer disposed on the sliding body for fitting the surface to be oiled of the guide rail, and surrounding the surface to be oiled of the guide rail so as to clean contaminants on the surface to be oiled of the guide rail when the sliding body is sliding, and
 wherein a mounting groove substantially in parallel with the oiling groove is on the inner side surface of the sliding body, and the cleaning layer is engaged or adhered to the mounting groove.

2. The guide rail oiling tool according to claim 1, wherein the inner side surface comprises at least one of a top side surface, a curved side surface, a straight side surface and an oblique side surface.

3. The guide rail oiling tool according to claim 1, wherein a shape of a cross section of the inner side surface perpendicular to the guide rail comprises at least one of a triangular shape and a trapezoidal shape.

4. The guide rail oiling tool according to claim 1, wherein the cleaning layer is disposed on the inner side surface of the sliding body and protrudes from the inner side surface of the sliding body.

5. The guide rail oiling tool according to claim 1, wherein the cleaning layer is disposed substantially parallel with the oiling groove.

6. The guide rail oiling tool according to claim 1, wherein at least one of the oiling groove and the cleaning layer is extending substantially conforming to a shape of a cross section of the inner side surface.

7. The guide rail oiling tool according to claim 1, wherein the cleaning layer is made from at least one of a rubber plate and a brush.

8. The guide rail oiling tool according to claim 1, wherein the sliding body comprises a first sub-sliding body and a second sub-sliding body that are relatively movable; wherein
 the first sub-sliding body is located on one side of the guide rail; and
 the second sub-sliding body is located on the other side of the guide rail.

9. The guide rail oiling tool according to claim 8, wherein the sliding body further comprises:
a connector disposed on a side of the sliding body away from the inner side surface and configured to rotationally connect the first sub-sliding body and the second sub-sliding body.

10. The guide rail oiling tool according to claim 9, wherein the connector comprises at least one of a buckle and a hinge.

11. The guide rail oiling tool according to claim 8, wherein the first sub-sliding body and the second sub-sliding body are substantially connectable in a concave shape.

12. The guide rail oiling tool according to claim 8, wherein the first sub-sliding body and the second sub-sliding body are substantially connectable in an L shape.

13. The guide rail oiling tool according to claim 1, wherein the oil inlet extends from a side of the sliding body away from the inner side surface to the oiling groove.

14. The guide rail oiling tool according to claim 1, further comprising:
an oil gun connected to the oil inlet for supplying a lubricating oil to the oiling groove through the oil inlet; and
an oil injecting pipe connected between the oil inlet and the oil gun.

15. A guide rail oiling tool, comprising:
a sliding body, for capping on a guide rail and being slidable along the guide rail, the sliding body having an inner side surface for facing a surface to be oiled of the guide rail, and a shape of the inner side surface being matched with a shape of the surface to be oiled of the guide rail;
an oil inlet disposed on the sliding body; and
an oiling groove in communication with the oil inlet, disposed on the inner side surface of the sliding body for surrounding the surface to be oiled of the guide rail, so that the oiling groove applies oil to the surface to be oiled of the guide rail when the sliding body is sliding,
wherein the guide rail oiling tool further comprises:
a cleaning layer disposed on the sliding body for fitting the surface to be oiled of the guide rail, and surrounding the surface to be oiled of the guide rail so as to clean contaminants on the surface to be oiled of the guide rail when the sliding body is sliding, and
wherein the cleaning layer is directly bonded to the inner side surface of the sliding body.

16. A guide rail oiling tool, comprising:
a sliding body, for capping on a guide rail and being slidable along the guide rail, the sliding body having an inner side surface for facing a surface to be oiled of the guide rail, and a shape of the inner side surface being matched with a shape of the surface to be oiled of the guide rail,
an oil inlet disposed on the sliding body; and
an oiling groove in communication with the oil inlet, disposed on the inner side surface of the sliding body for surrounding the surface to be oiled of the guide rail, so that the oiling groove applies oil to the surface to be oiled of the guide rail when the sliding body is sliding,
The guide rail oiling tool according to claim 1, wherein the sliding body comprises a first sub-sliding body and a second sub-sliding body that are relatively movable, wherein
the first sub-sliding body is located on one side of the guide rail; and
the second sub-sliding body is located on the other side of the guide rail,
wherein the first sub-sliding body is provided thereon with a through hole, and the second sub-sliding body is provided thereon with a threaded hole; and the sliding body further comprises:
an adjusting bolt, which is fitted to the threaded hole in a screw-thread manner by passing through the through-hole so that the first sub-sliding body and the second sub-sliding body are integrally fixed, and a gap between the sliding body and the guide rail being adjusted based on a depth of the threaded hole to which the adjusting bolt is screwed.

\* \* \* \* \*